US007424362B2

(12) United States Patent
Konrad et al.

(10) Patent No.: US 7,424,362 B2
(45) Date of Patent: Sep. 9, 2008

(54) APPARATUS AND METHOD FOR READING ADAPTIVE VALUES OUT OF MOTOR VEHICLE CONTROL DEVICES

(75) Inventors: Heiko Konrad, Baierbrunn (DE); Maximilian Engl, Friedberg-Bachern (DE); Marcus Engelke, Munich (DE); Mario Wohlwender, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/727,609

(22) Filed: Mar. 27, 2007

(65) Prior Publication Data

US 2007/0174503 A1 Jul. 26, 2007

Related U.S. Application Data

(63) Continuation of application No. PCT/EP2005/009606, filed on Sep. 7, 2005.

(30) Foreign Application Priority Data

Sep. 30, 2004 (DE) ....................... 10 2004 047 542

(51) Int. Cl.
*G06F 19/00* (2006.01)
*G06F 3/00* (2006.01)
*G01M 17/00* (2006.01)

(52) U.S. Cl. ......................... 701/102; 701/29; 701/115; 710/20

(58) Field of Classification Search ................. 701/102, 701/29, 115; 710/20, 31–35
See application file for complete search history.

(56) References Cited

U.S. PATENT DOCUMENTS 5,318,449 A 6/1994 Schoell et al.

(Continued)

FOREIGN PATENT DOCUMENTS

DE 199 48 663 A1 5/2001

(Continued)

OTHER PUBLICATIONS

International Search Report dated Nov. 25, 2005 with English translation of relevant portion (Six (6) pages).

(Continued)

*Primary Examiner*—Willis R. Wolfe, Jr.
*Assistant Examiner*—Johnny H. Hoang
(74) *Attorney, Agent, or Firm*—Crowell & Moring LLP

(57) ABSTRACT

A device and a method for reading out adaptation values of self-adapting functions from a motor vehicle control unit to an external readout unit are provided. The device consists of a motor vehicle control unit, an external readout unit, and a communication interface between the external readout unit and the motor vehicle control unit, the motor vehicle control unit including a nonvolatile memory for storing adapted parameters or parameter sets of the self-adapting functions. The motor vehicle control unit additionally includes a receiver for receiving at least one test value set transmitted by the external readout unit, a calculation unit for calculating at least one adaptation value as a function of the test value set and the adapted parameters or parameter sets, and a transmitter for transmitting the at least one calculated adaptation value to the external readout unit.

20 Claims, 1 Drawing Sheet

U.S. PATENT DOCUMENTS

| | | | | | |
|---|---|---|---|---|---|
| 5,708,307 | A * | 1/1998 | Iijima et al. | 307/10.5 |
| 6,112,152 | A * | 8/2000 | Tuttle | 701/115 |
| 6,263,197 | B1 * | 7/2001 | Shibagaki et al. | 455/186.1 |
| 6,334,085 | B1 * | 12/2001 | Kawamura et al. | 701/115 |
| 6,829,515 | B2 | 12/2004 | Grimm | |
| 6,895,446 | B2 * | 5/2005 | Luzzatto | 710/5 |
| 7,130,739 | B2 * | 10/2006 | Ito et al. | 701/115 |
| 2001/0032498 | A1 | 10/2001 | Fujino et al. | |

FOREIGN PATENT DOCUMENTS

| | | | |
|---|---|---|---|
| DE | 100 48 826 | A1 | 4/2002 |
| DE | 101 31 839 | A1 | 1/2003 |
| DE | 102 20 600 | A1 | 12/2003 |
| EP | 1 087 589 | A1 | 3/2001 |
| WO | WO 00/40049 | A1 | 7/2000 |
| WO | WO 01/61176 | A2 | 8/2001 |

OTHER PUBLICATIONS

German Office Action dated Jun. 27, 2005 with English translation of relevant portion (Five (5) pages).

* cited by examiner

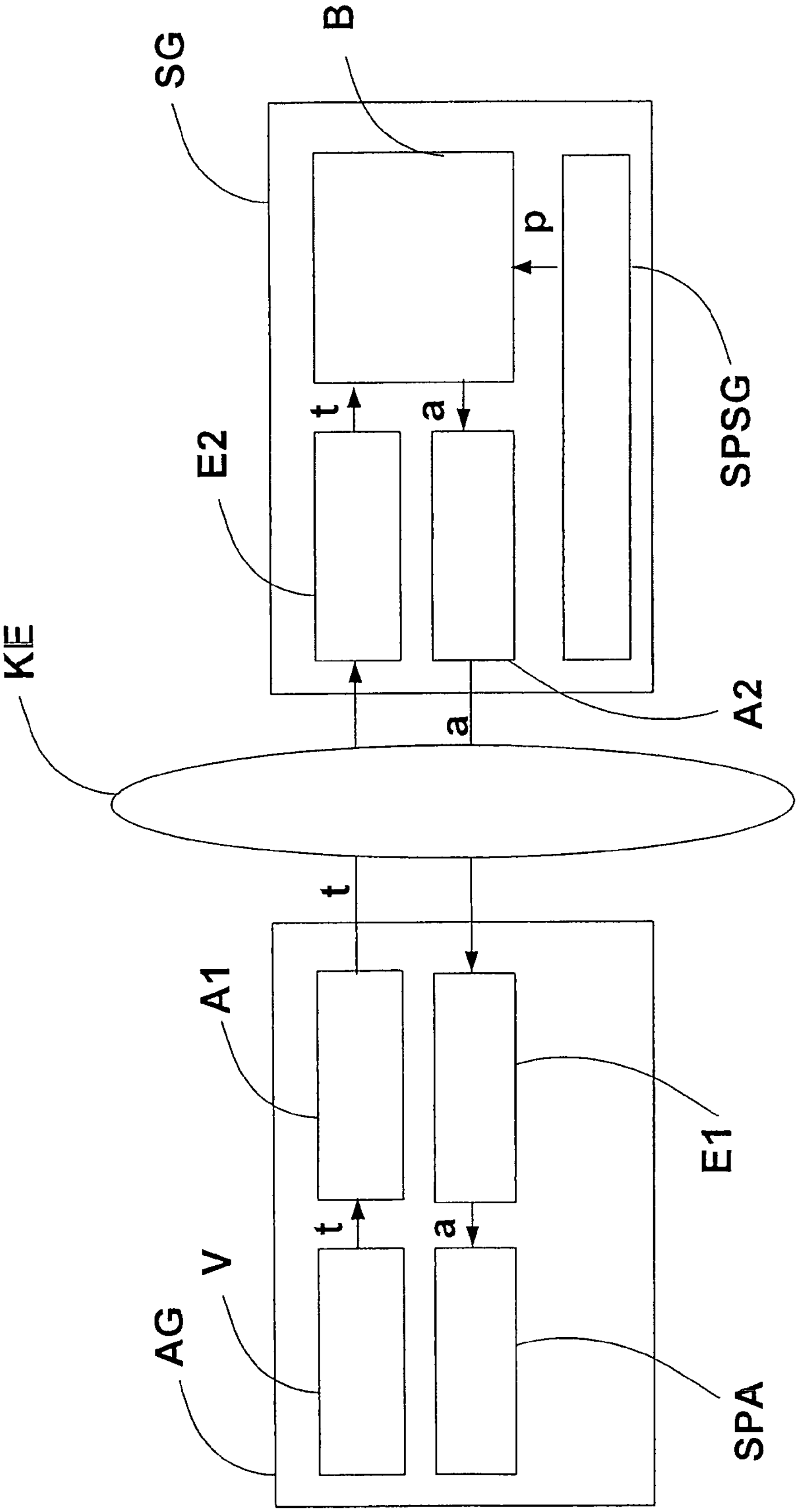
SG
B
p
SPSG
E2
t
a
KE
A2
a
t
A1
E1
t
a
V
AG
SPA

APPARATUS AND METHOD FOR READING ADAPTIVE VALUES OUT OF MOTOR VEHICLE CONTROL DEVICES

CROSS REFERENCE TO RELATED APPLICATIONS

This application is a continuation of PCT International Application No. PCT/EP2005/009606, filed Sep. 7, 2005, which claims priority under 35 U.S.C. § 119 to German Patent Application No. 10 2004 047 542.3, filed Sep. 30, 2004, the entire disclosures of which are herein expressly incorporated by reference.

BACKGROUND AND SUMMARY OF THE INVENTION

The present invention relates to a device for reading out adaptation values of self-adapting functions from a motor vehicle control unit at an external readout unit and to a method for reading out adaptation values of self-adapting functions from a motor vehicle control unit.

Self-adapting functions are increasingly used in modern motor vehicle control units. The goal is to adapt the controllers optimally to individual component tolerances, aging effects, or other deviations. A typical area of use is the adaptation of the engine controller in the scope of knock control.

While in the past only a few adaptations were predominantly ascertained, such as offset values that were factors of self-adapting functions, currently more complex memory structures are increasingly used, such as adaptive program maps or adaptive neuronal networks. The current memory structures offer the advantage that various adaptation values may thus be stored as a function of the operating point.

The product of such complex adaptation methods is a parameter set, which describes the program maps content of the adapted program maps and/or the weightings of the adaptive neuronal networks, for example. This parameter set is stored in a nonvolatile memory in the control unit and thus may be used in a following engine cycle.

For repair shops or in the scope of the development of engine controllers, it is often important to read out the current state of the adaptation. In the case of few adaptation values, e.g., for offset values or factors, a direct readout using typical readout units, such as a tester or a unit for development data feedback, is easily possible. German patent document DE 199 48 663 C2 is an example thereof, from which a device for reading out various vehicle data, inter alia, adaptation values, at an external diagnostic unit is known.

A disadvantage of these known devices and methods for reading out the adaptation values is, above all, that, in the event of a large amount of data to be read out, the transmission of all of the data requires a long time.

A further disadvantage results with self-adapting program maps or neuronal networks. The adaptive parameter set describes the value contents at the support points predefined in the controller. In order to be able to assign the adaptation values to the individual operating point, the particular support points must be known in the readout unit, because of which the readout units must be very complex and designed individually. Similar problems result in adapted neuronal networks, in which the parameter set describes the weightings of the adaptive networks.

An object of the present invention is to provide a device improved in regard to the above-mentioned disadvantages and an improved method for reading out the adaptation values of self-adapting functions.

This and other objects and advantages are achieved by a device and a method according to the present invention.

A device according to an exemplary embodiment of the present invention for reading out adaptation values of self-adapting functions from a motor vehicle control unit at an external readout unit includes a motor vehicle control unit, an external readout unit, and a communication interface between the external readout unit and the motor vehicle control unit. The motor vehicle control unit includes a nonvolatile memory for storing adapted parameters or parameter sets of the self-adapting functions, a receiver configured to receive at least one test value set transmitted by the external readout unit, a calculation unit configured to calculate at least one adaptation value as a function of the test value set in the adapted parameters or parameter sets, and a transmitter configured to transmit the calculated adaptation value to the external readout unit.

In a method according to an exemplary embodiment of the present invention corresponding to the device for reading out adaptation values of self-adapting functions of the motor vehicle control unit at the external readout unit, in which adapted parameters or parameter sets of the self-adapting functions are stored in the motor vehicle control unit, the external readout unit transmits a test value set describing a test operating point to the motor vehicle control unit and the motor vehicle control unit calculates at least one adaptation value from the test value set and the adapted parameters or parameter sets and transmits it to the readout unit.

Using the device and/or the method according to the present invention, adaptation values may be read out of the motor vehicle control units using comparatively simple readout units and displayed and/or stored in easily interpretable form. Because the calculation of the adaptation values was already performed directly in the control unit, the method and/or the external readout unit is independent of the adapted function. The outlay for reading out the adaptation values is thus significantly reduced, because in this case no adaptation of the readout units is necessary.

The test value set advantageously describes a test operating point of the self-adapting function. Depending on which operating point for which the adaptations are to be read out, a corresponding operating-point-dependent test value set is transmitted from the readout unit to the motor vehicle control unit.

The test value set may advantageously include one or more operating-point-dependent test values as a function of how many operating points for which the adaptation values are to be read out.

If the test value set includes multiple operating-point-dependent test values, these are advantageously transmitted simultaneously to the motor vehicle control unit and the calculation of the adaptation values is performed sequentially for the individual operating points in the motor vehicle control unit. The ascertained adaptation values are subsequently transmitted back to the readout unit and stored or processed further therein.

At least one of the self-adapting functions advantageously includes an adaptive program map or adaptive neuronal network. The device according to the present invention or the method according to the present invention is especially suitable precisely in self-adapting functions of this type, because in program maps, the adapted parameter set describes the value contents at the support points predefined in the controller. By transmitting an operating-point-dependent test value set, the adaptation values are uniquely assigned to the corresponding test operating point and the particular support points no longer have to be known to the readout unit.

If, in the course of development or in the event of model modifications, the number of support points of the adaptive program maps or the structure of the adaptive neuronal networks changes, the readout unit no longer has to be adapted. This results in a significant reduction in complexity.

The motor vehicle control unit advantageously may be an engine control unit or a transmission control unit, because motor vehicle control units of this type often perform many controls using self-adapting program maps or neuronal networks.

A serial interface may be advantageously used as the communication interface between the motor vehicle control unit and the external readout unit. However, the transmission may also be wireless. The external readout unit may advantageously contain an internal memory and/or be coupled to further devices which perform further analyses using the read out adaptation values.

Other objects, advantages and novel features of the present invention will become apparent from the following detailed description of the invention when considered in conjunction with the accompanying drawings.

BRIEF DESCRIPTION OF THE DRAWING

The single drawing shows an exemplary embodiment of the device according to the present invention, on the basis of which the method according to the present invention is explained.

DETAILED DESCRIPTION OF THE DRAWING

The device includes a motor vehicle control unit SG, which may be an engine control unit, an external readout unit AG, and a communication interface KE, the communication interface KE being implemented as a serial interface.

The motor vehicle control unit includes a nonvolatile memory SPSG for storing adapted parameter values or parameter sets (p) of the at least one self-adapting function, receiver E2 configured to receive at least one test value set (t) transmitted from the external readout unit AG, calculation unit B configured to calculate at least one adaptation value (a) on the basis of the adapted parameter values or parameter sets (p) and the test value set (t), as well as transmitter A2 configured to transmit the adaptation value(s) (a) to the external readout unit AG. The adapted parameter values or parameter sets (p) may be adapted network or program map parameters.

The external readout unit AG may be a normal repair shop tester or a device for development data feedback, for example. It includes a presetting unit V for presetting one or more test value sets (t), transmitter A1 for sending at least a test value set (t), receiver E1 for receiving the calculated adaptation values (a), and memory SPA for outputting and/or storing the adaptation values (a).

The readout of the adaptation values a from the motor vehicle control unit SG to the external readout unit AG is performed as follows.

The test value set (t) predefined using the presetting unit V, which describes a test operating point, is transmitted using A1 via the communication interface KE to the motor vehicle control unit SG. At least one adaptation value (a) is calculated for this test operating point (t) from the stored parameter values or parameter sets (p), which is transmitted using A2 via the communication interface KE to the external readout unit AG. The at least one adaptation value (a) is stored and/or output in the output unit using the memory SPA.

Instead of a single test value set (t) or test operating point, multiple test operating points may also be transmitted simultaneously to the motor vehicle control unit SG. In this case, the motor vehicle control unit SG calculates the adaptation values (a) sequentially for the individual test operating points (t) and subsequently sends them back again to the external readout unit AG, where they are stored or processed further.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for reading out adaptation values of self-adapting functions from a motor vehicle control unit to an external readout unit, the device comprising:

a motor vehicle control unit;

an external readout unit; and a communication interface between the external readout unit and the motor vehicle control unit, wherein the motor vehicle control unit comprises a nonvolatile memory for storing adapted parameters or parameter sets of the self-adapting functions;

a receiver configured to receive at least one test value set transmitted from the external readout unit;

a calculation unit configured to calculate at least one adaptation value as a function of the at least one test value set and the adapted parameters or parameter sets; and a transmitter configured to transmit the at least one calculated adaptation value to the external readout unit.

2. The device according to claim 1, wherein the test value set describes a test operating point of the self-adapting function.

3. The device according to claim 1, wherein the test value set includes one or more operating-point-dependent test values.

4. The device according to claim 3, wherein, for a test value set which includes multiple operating-point-dependent test values, calculation of the adaptation values is performed sequentially.

5. The device according to claim 1, wherein at least one of the self-adapting functions comprises an adaptive program map or adaptive neuronal network.

6. The device according to claim 1, wherein the motor vehicle control unit is an engine control unit or a transmission control unit.

7. The device according to claim 1, wherein the communication interface is a serial interface.

8. The device according to claim 1, wherein the readout unit comprises at least one of a memory for storing the at least one adaptation value and a coupler for coupling to further devices.

9. The device according to claim 2, wherein the test value set includes one or more operating-point-dependent test values.

10. The device according to claim 9, wherein, for a test value set which includes multiple operating-point-dependent test values, calculation of the adaptation values is performed sequentially.

11. The device according to claim 2, wherein at least one of the self-adapting functions comprises an adaptive program map or adaptive neuronal network.

12. The device according to claim 2, wherein the motor vehicle control unit is an engine control unit or a transmission control unit.

13. The device according to claim 2, wherein the communication interface is a serial interface.

14. The device according to claim 2, wherein the readout unit comprises at least one of a memory for storing the at least one adaptation value and a coupler for coupling to further devices.

15. The device according to claim 3, wherein at least one of the self-adapting functions comprises an adaptive program map or adaptive neuronal network.

16. The device according to claim 3, wherein the motor vehicle control unit is an engine control unit or a transmission control unit.

17. The device according to claim 3, wherein the communication interface is a serial interface.

18. The device according to claim 3, wherein the readout unit comprises at least one of a memory for storing the at least one adaptation value and a coupler for coupling to further devices.

19. The device according to claim 4, wherein at least one of the self-adapting functions comprises an adaptive program map or adaptive neuronal network.

20. A method for reading out adaptation values of self-adapting functions from a motor vehicle control unit to an external readout unit, the motor vehicle control unit storing adapted parameters or parameter sets of the self-adapting functions, comprising the acts of:

transmitting at least one test value set describing a test operating point from the external read out unit to the motor vehicle control unit;

calculating, in the motor vehicle control unit, at least one adaptation value from the test value set and the adapted parameters or parameter sets; and transmitting the at least one adaptation value to the readout unit.

* * * * *